No. 805,528. PATENTED NOV. 28, 1905.
E. CANTONO.
VEHICLE WHEEL.
APPLICATION FILED JAN. 30, 1905.
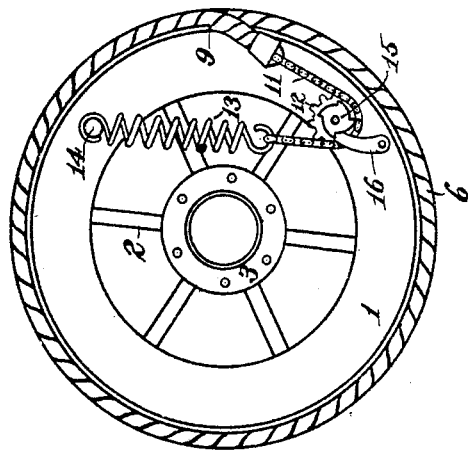
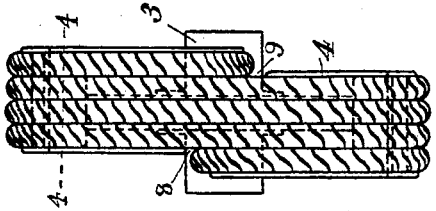
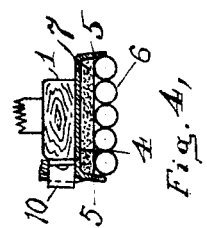
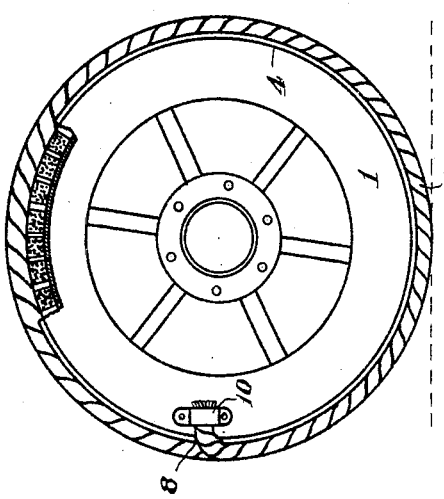
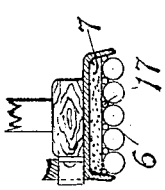
Witnesses:
Alexander S. Rodman
Grace L. Heasley
Inventor:
Eugenio Cantono
By Charles S. Jones
His Attorney

UNITED STATES PATENT OFFICE.

EUGENIO CANTONO, OF ROME, ITALY.

VEHICLE-WHEEL.

No. 805,528.  Specification of Letters Patent.  Patented Nov. 28, 1905.

Application filed January 30, 1905. Serial No. 243,345.

*To all whom it may concern:*

Be it known that I, EUGENIO CANTONO, a subject of the King of Italy, residing at Rome, Italy, have invented certain new and useful Improvements in Vehicle-Wheels, of which the following is a specification.

The present invention relates to a vehicle-wheel, one object of which is to construct a wheel with a rim comprising a rope tread and a take-up device by means of which is secured an effective adherence between said tread and the rim in which it is seated. This and other objects of the invention are secured by the following-described means, the novel features being pointed out in the claims.

In the accompanying drawings, in which similar reference-numerals indicate similar parts, Figure 1 is a side view of a wheel embodying my invention, a portion of the felly being broken away. Fig. 2 is a similar view of the opposite side of the wheel. Fig. 3 is a top view; Fig. 4, a sectional view on the plane of the line 4 4 of Fig. 3, and Fig. 5 is a sectional view of a modification.

Referring to the drawings, the numeral 1 designates the felly of the wheel, usually made of wood, into which the outer ends of the spokes 2 are inserted.

3 designates the hub, to which the inner ends of the spokes are secured.

The tire comprises a metal rim 4, which is shrunk on the periphery of the felly 1 and is preferably formed with outwardly-extended flanges 5. Within said rim is seated a cable or rope 6, constituting the tread of the tire, which rope may be made of a vegetable fiber or of iron, steel, or other metallic wire or of other suitable material, such as leather, and in form may be made round of twisted strands or flat of plaited strands. However formed the diameter of the rope will be such that it projects beyond the flange 5, so as to provide a good bearing surface or tread. Under some conditions it may be necessary or desirable to interpose a bed or cushion of elastic material 7, preferably rubber or rubber composition, between the tread 6 and rim 4, thereby increasing the elasticity of the tire as a whole and the life of the rope tread. The elastic cushion 7 completely encircles the rim 4 and is held securely to its seat by the pressure of the tread thereon, or additionally said cushion may be secured to the rim by cement or otherwise.

One half of the rim 4 is offset from the other half, as shown in Fig. 3, two openings 8 and 9 being provided on opposite sides for the passage of the rope. In close proximity to the opening 8 is secured on the side of the felly a clamp 10, of any suitable construction, to which clamp the end of the rope 6, which passes through the opening 8, is attached for the purpose of holding and preventing the rope from slipping out. The other or free end of the rope passes through the opening 9 on the opposite side of the rim 4 and is attached by a suitable clamp to a take-up device comprising a chain 11, which chain is passed over a sprocket-wheel 12, supported in a spindle secured to the side of the felly. At its other end the chain 11 is attached to a spring 13, said spring being fast at one end to a stud 14 on the felly and exerting a constant pull on the free end of the rope. Fixed to the side of the sprocket-wheel 12 is a ratchet 15, adapted to be engaged by a spring-pressed stop-pawl 16, pivoted to a stud on the side of the felly.

In placing the tread upon the wheel one end of the rope is secured in fixed position to the clamp 10 and then wound about the wheel in the seat provided by rim 4 in a left-handed direction, or the reverse of the normal direction of rotation of the wheel. The rope is wound as snug as possible by hand or suitable machinery, so as to fill the section of the rim 4, and the free end then attached to chain 11. When in use, the wheel rotating right-handed, any creeping or stretching of the rope will be in the direction of its free end, the take-up device keeping the rope taut and acting to secure an effective adherence at all times between the tread and the rim. As the ratchet-wheel 15 is secured to the sprocket-wheel 12, any return movement of the rope is prevented by means of pawl 16. Instead of a chain and sprocket-wheel I may use a belt and pulley.

The tread may be made of a single length of rope wound about the rim in one or more convolutions or it may be made of several separate ropes, one end of each of the ropes being secured to a fixed clamp or clamps 10 and the free ends by means of a suitable clamp to the chain 11. Also a rope or ropes of smaller diameter than that constituting the tread may be interposed between the latter and the rim 4 or the elastic cushion 7, as shown at 17 in Fig. 5. In such case the smaller rope is held in position by the tread.

A tire of the character above described is practically indestructible and obviously nonpuncturable. All the road wear is directly on the rope tread, and as the tread described affords a good gripping-surface skidding or slipping upon wet pavements is entirely overcome and traction in mud or sand materially assisted. Disadvantages incident to the creeping of a tire are overcome by the manner of connecting the free end of the tread, the spring 13 taking up any elongation or any longitudinal movement of the rope, preserving it in a taut condition.

While I have shown in Fig. 3 the rim so constructed that one half is offset from the other half, my invention is not limited to such form, as obviously I may use a rim having its sides in one plane or of similar section throughout.

What I claim, and desire to secure by Letters Patent, is—

1. In a vehicle-wheel the combination of a tire comprising a rope tread one end of which is fixed and the other free, and a take-up device to which the free end of said rope is attached.

2. In a vehicle-wheel the combination of a tire comprising a rope tread one end of which is fixed and the other free, and a take-up device comprising a spring to which the free end of said rope is attached.

3. In a vehicle-wheel the combination of a tire comprising a rope tread one end of which is fixed and the other free, a take-up device to which the free end of said rope is attached, and means to prevent the return movement of said rope.

4. In a vehicle-wheel the combination of a felly, a tire secured to said felly, said tire comprising a rope tread one end of which is secured to the felly, and the other end free, and a take-up device secured to the felly to which the free end of the rope is attached.

5. In a vehicle-wheel the combination of a felly, a tire comprising a rope tread one end of which is fixed and the other free, a chain to which the free end of the rope is attached, a sprocket-wheel mounted on a spindle secured to the side of the felly, a spring fixed at one end and attached at its other to said chain, and means to prevent a reverse movement of said sprocket-wheel.

6. In a vehicle-wheel the combination of a felly, a tire comprising a rope tread one end of which is fixed and the other free, a chain to which the free end of the rope is attached, a sprocket-wheel mounted on a spindle secured to the side of the felly, a spring fixed at one end and attached at its other to said chain, a ratchet secured to said sprocket-wheel, and a pawl engaging said ratchet.

7. A vehicle-wheel comprising a tire having a rim one half of which is offset from the other half and a rope tread seated in said rim.

8. A vehicle-wheel comprising a tire having a rim, a rope tread supported in said rim and a rope of smaller diameter interposed between said tread and rim.

In testimony whereof I have hereunto signed my name in the presence of two subscribing witnesses.

EUGENIO CANTONO.

Witnesses:
E. F. PORTER,
JEAN LAVERGNE.